United States Patent
David (10) Patent No.: US 10,834,335 B2
(45) Date of Patent: *Nov. 10, 2020

(54) INTERACTIVE GUEST IMAGE CAPTURE USING VIDEO WALL/FLOOR/CEILING DISPLAYS FOR SELECTIONS OF BACKGROUND SCENES, AND SELECTION/DISTRIBUTION OF CUSTOMIZED SOUVENIR PORTFOLIOS INCLUDING MERGED IMAGES/SOUND

(71) Applicant: FREEZE FRAME, LLC, Orlando, FL (US)

(72) Inventor: Clifford R David, New York, NY (US)

(73) Assignee: FREEZE FRAME, LLC, Orlando, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/379,065

(22) Filed: Apr. 9, 2019

(65) Prior Publication Data

US 2019/0238761 A1    Aug. 1, 2019

Related U.S. Application Data

(63) Continuation of application No. 15/948,301, filed on Apr. 9, 2018, now Pat. No. 10,257,442, which is a (Continued)

(51) Int. Cl.
G09G 5/00     (2006.01)
H04N 5/275    (2006.01)
(Continued)

(52) U.S. Cl.
CPC ............ *H04N 5/275* (2013.01); *G06F 16/51* (2019.01); *G06Q 20/123* (2013.01);
(Continued)

(58) Field of Classification Search
CPC ........ H04N 5/272; H04N 5/275; G03B 17/53; G06T 11/00; G06T 11/60
See application file for complete search history.

(56) References Cited

U.S. PATENT DOCUMENTS 5,345,313 A    9/1994    Blank
5,448,320 A    9/1995    Sakai et al.
(Continued)

FOREIGN PATENT DOCUMENTS

| | | |
|---|---|---|
| JP | 2001-148822 | 5/2001 |
| JP | 2002-297753 | 11/2002 |
| JP | 2004-297191 | 10/2004 |

OTHER PUBLICATIONS

Gilmore et al., Customer Experience Places: The New Offering Frontier; Strategy & Leadership. Chicago:2002. vol. 30, Iss. 4; p. 4: Retrieved from ProQuestDirect 011 th.
(Continued)

*Primary Examiner* — Charles Tseng
(74) *Attorney, Agent, or Firm* — Cooper & Dunham LLP (57) ABSTRACT

Systems and methods for creating and distributing professional quality pictorial souvenirs giving the illusion that guests of a facility were imaged at other locations, including making initial arrangements with guests, showing selections of background scene images at video displays and flashing chroma key images interspersed with frames of the scene images, taking key guest images in synch with the flashed key images, extracting guest image content from the key guest images and merging into selecting scene images, showing preview merges images for guest selection and providing souvenir portfolios that include merged images to guests or designees after making financial arrangements, including for payment to third parties for copyright content
(Continued)

included in the souvenirs and with advertisers for promotional material included in the souvenirs.

18 Claims, 4 Drawing Sheets

Related U.S. Application Data continuation of application No. 14/952,061, filed on Nov. 25, 2015, now Pat. No. 9,948,870, which is a continuation of application No. 14/136,044, filed on Dec. 20, 2013, now Pat. No. 9,214,032, which is a continuation-in-part of application No. 14/135,858, filed on Dec. 20, 2013, now Pat. No. 9,270,841, which is a continuation-in-part of application No. 13/914,533, filed on Jun. 10, 2013, now abandoned, which is a continuation-in-part of application No. 12/772,275, filed on May 3, 2010, now Pat. No. 8,463,654, said application No. 13/914,533 is a continuation-in-part of application No. 13/116,487, filed on May 26, 2011, now Pat. No. 8,615,443, which is a continuation of application No. 11/691,583, filed on Mar. 27, 2007, now Pat. No. 7,966,223, which is a continuation-in-part of application No. 11/279,642, filed on Apr. 13, 2006, now Pat. No. 7,881,968, said application No. 13/914,533 is a continuation-in-part of application No. 13/299,679, filed on Nov. 18, 2011, now abandoned, which is a continuation-in-part of application No. 11/854,605, filed on Sep. 13, 2007, now Pat. No. 8,260,674, which is a continuation-in-part of application No. 11/691,583, filed on Mar. 27, 2007, now Pat. No. 7,966,223, said application No. 13/914,533 is a continuation-in-part of application No. 13/594,299, filed on Aug. 24, 2012, now Pat. No. 9,270,840.

(60) Provisional application No. 61/174,515, filed on May 1, 2009, provisional application No. 61/293,035, filed on Jan. 7, 2010, provisional application No. 60/671,928, filed on Apr. 15, 2005, provisional application No. 61/415,026, filed on Nov. 18, 2010, provisional application No. 61/526,823, filed on Aug. 24, 2011.

(51) Int. Cl.
| | | |
|---|---|---|
| *H04N 5/04* | (2006.01) | |
| *H04N 9/75* | (2006.01) | |
| *G06Q 30/06* | (2012.01) | |
| *G06Q 20/14* | (2012.01) | |
| *G06Q 30/02* | (2012.01) | |
| *H04N 5/28* | (2006.01) | |
| *G06F 16/51* | (2019.01) | |
| *G07F 17/16* | (2006.01) | |
| *G06Q 20/12* | (2012.01) | |
| *H04N 5/247* | (2006.01) | |

(52) U.S. Cl.
CPC ....... *G06Q 20/1235* (2013.01); *G06Q 20/145* (2013.01); *G06Q 30/0269* (2013.01); *G06Q 30/0621* (2013.01); *G07F 17/16* (2013.01); *H04N 5/04* (2013.01); *H04N 5/247* (2013.01); *H04N 5/28* (2013.01); *H04N 9/75* (2013.01)

(56) References Cited

U.S. PATENT DOCUMENTS

| | | | |
|---|---|---|---|
| 5,469,536 A | 11/1995 | Blank | |
| 5,587,740 A | 12/1996 | Brennan et al. | |
| 5,606,365 A | 2/1997 | Maurinus et al. | |
| 5,623,581 A * | 4/1997 | Attenberg | G03B 17/53 |
| | | | 348/64 |
| 5,768,633 A | 6/1998 | Allen et al. | |
| 5,986,718 A * | 11/1999 | Barwacz | H04N 9/75 |
| | | | 345/634 |
| 6,133,946 A | 10/2000 | Cavallaro et al. | |
| 6,215,485 B1 | 4/2001 | Phillips | |
| 6,215,519 B1 | 4/2001 | Nayar et al. | |
| 6,222,646 B1 | 4/2001 | Maurinus et al. | |
| 6,385,772 B1 | 5/2002 | Courtney | |
| 6,417,913 B2 | 7/2002 | Tanaka | |
| 6,504,552 B2 | 1/2003 | Phillips | |
| 6,532,345 B1 | 3/2003 | Gluck | |
| 6,542,824 B1 | 4/2003 | Berstis | |
| 6,591,068 B1 | 7/2003 | Dietz | |
| 6,628,899 B1 | 9/2003 | Kito | |
| 6,698,943 B2 | 3/2004 | Gluck | |
| 6,759,957 B2 | 7/2004 | Murakami et al. | |
| 6,774,936 B1 | 8/2004 | Park | |
| 6,856,346 B1 | 2/2005 | Kobayashi | |
| 6,985,875 B1 | 1/2006 | Wolf | |
| 7,077,581 B2 | 7/2006 | Gluck | |
| 7,154,621 B2 | 12/2006 | Rodriguez et al. | |
| 7,158,945 B1 | 1/2007 | Wolcott et al. | |
| 7,283,687 B2 | 10/2007 | Bodin et al. | |
| 7,301,558 B2 | 11/2007 | Gluck | |
| 7,301,569 B2 | 11/2007 | Kinjo et al. | |
| 7,343,320 B1 | 3/2008 | Treyz et al. | |
| 7,466,909 B2 | 12/2008 | Meninger | |
| 7,607,843 B2 | 10/2009 | Gluck | |
| 7,714,936 B1 | 5/2010 | Martin et al. | |
| 7,881,968 B2 | 2/2011 | David | |
| 7,966,223 B2 | 6/2011 | David | |
| 8,260,674 B2 | 9/2012 | David | |
| 8,463,654 B1 | 6/2013 | David | |
| 8,615,443 B2 | 12/2013 | David | |
| 8,635,115 B2 | 1/2014 | David | |
| 9,214,032 B2 | 12/2015 | David | |
| 9,270,840 B2 | 2/2016 | David | |
| 9,270,841 B2 | 2/2016 | David | |
| 9,948,870 B2 | 4/2018 | David | |
| 10,257,442 B2 | 4/2019 | David | |
| 2001/0018660 A1 | 8/2001 | Sehr | |
| 2002/0085762 A1 | 7/2002 | Shniberg et al. | |
| 2002/0128934 A1 | 9/2002 | Shaer | |
| 2002/0186956 A1 * | 12/2002 | Lowry | G02B 6/06 |
| | | | 385/147 |
| 2003/0023452 A1 | 1/2003 | Novais | |
| 2003/0067543 A1 | 4/2003 | Okada | |
| 2003/0067962 A1 | 4/2003 | Yellin | |
| 2003/0069762 A1 | 4/2003 | Gathman et al. | |
| 2003/0086123 A1 | 5/2003 | Torrens-Burton | |
| 2003/0222899 A1 | 12/2003 | Alvesalo | |
| 2004/0008872 A1 | 1/2004 | Goldberg | |
| 2004/0032495 A1 | 2/2004 | Ortiz | |
| 2004/0152486 A1 | 8/2004 | Sano | |
| 2004/0189816 A1 | 9/2004 | Nakazawa et al. | |
| 2004/0201683 A1 | 10/2004 | Murashita et al. | |
| 2004/0201709 A1 | 10/2004 | McIntyre et al. | |
| 2004/0218058 A1 | 11/2004 | Yamaguchi et al. | |
| 2004/0218918 A1 | 11/2004 | Gluck | |
| 2005/0002643 A1 | 1/2005 | Smith | |
| 2005/0091119 A1 | 4/2005 | Tuijn et al. | |
| 2005/0117018 A1 | 6/2005 | Wolf | |
| 2005/0195216 A1 * | 9/2005 | Kramer | G06F 3/14 |
| | | | 345/619 |
| 2006/0015554 A1 | 1/2006 | Umezaki et al. | |
| 2006/0114531 A1 * | 6/2006 | Webb | G01N 21/8806 |
| | | | 359/15 |
| 2006/0125930 A1 | 6/2006 | Mindrum et al. | |
| 2006/0146765 A1 | 7/2006 | Van De Sluis et al. | |

(56) References Cited

U.S. PATENT DOCUMENTS

| | | |
|---|---|---|
| 2006/0158520 A1 | 7/2006 | Funakura |
| 2007/0003113 A1 | 1/2007 | Goldberg |
| 2008/0084508 A1 | 4/2008 | Cole et al. |
| 2008/0234049 A1 | 9/2008 | LeBlanc et al. |
| 2008/0251575 A1 | 10/2008 | Bowling et al. |
| 2009/0052736 A1 | 2/2009 | Kacker |
| 2012/0133782 A1 | 5/2012 | David |
| 2013/0188063 A1 | 7/2013 | Cameron |
| 2015/0347827 A1 | 12/2015 | Dickinson et al. |
| 2016/0205358 A1 | 7/2016 | Dickinson |

OTHER PUBLICATIONS

Picture Your Perfect Camera, Derrick Story. Macworld. San Francisco: Jan. 2005. vol. 22, Iss.I; p. 60, download from ProQuestDirect on the Internet on Apr. 23, 2012.

* cited by examiner

Fig. 1

100: INTERACT WITH GUEST TO INITIATE TRANSACTION AND TO RECORD IDENTIFICATION AND PAYMENT INFORMATION

102: USHER GUEST TO VIDEO DISPLAY SURFACE SITE

104: SHOW SELECTION OF BACKGROUND SCENES, RECORD SELECTION CHOICE, CONTINUE SHOWING SELECTED SCENE(S)

106: FLASH KEY IMAGE FRAMES, E.G., AS SUCCESSION OF DIFFERENT COLORS, OR AS COLOR(S) SELECTED FROM ANALYSIS OF GUEST IMAGE, TAKE KEY GUEST IMAGES IN SYNC WITH FLASHED OF KEY IMAGES

108: COMPUTER-PROCESS KEY GUEST IMAGES TO EXTRACT GUEST IMAGE CONTENT

110: SELECT BEST EXTRACTIONS FROM DIFFERENT COLOR KEY IMAGES

112: MERGE EXTRACTED GUEST IMAGES INTO BACKGROUND SCENE IMAGES

114: SHOW INITIAL MERGED IMAGES, SECURE ORDERS TO PURCHASE

116: GENERATE PICTORIAL SOUVENIRS CONTAINING MERGED IMAGES

118: CALCULATE CHARGES & CHARGE GUEST, CHARGE THIRD PARTIES FOR ANY PROMOTIONAL MATERIAL IN THE SOUVENIRS, AND COMPENSATE RIGHTS HOLDERS FOR ANY PROTECTED MATERIAL IN SOUVENIRS

120: DELIVER SOUVENIRS TO GUESTS AND/OR DESIGNEES

INTERACTIVE GUEST IMAGE CAPTURE USING VIDEO WALL/FLOOR/CEILING DISPLAYS FOR SELECTIONS OF BACKGROUND SCENES, AND SELECTION/DISTRIBUTION OF CUSTOMIZED SOUVENIR PORTFOLIOS INCLUDING MERGED IMAGES/SOUND

REFERENCE TO RELATED APPLICATIONS

This patent application is a continuation of application Ser. No. 15/948,301, filed Apr. 9, 2018, which is a continuation of application Ser. No. 14/952,061 filed Nov. 25, 2015, now U.S. Pat. No. 9,948,870 issued Apr. 7, 2018, which is a continuation of application Ser. No. 14/136,044 filed Dec. 20, 2013 now U.S. Pat. No. 9,214,032 issued Dec. 15, 2015, which is in-part (CIP) of application Ser. No. 14/135,858 filed Dec. 20, 2013 now U.S. Pat. No. 9,270,841 issued Feb. 23, 2016, which is a CIP of application Ser. No. 13/914,533 filed Jun. 10, 2013, which is a CIP of:

(1) Application Ser. No. 12/772,275 filed May 3, 2010 and now U.S. Pat. No. 8,463,654 issued Jun. 11, 2013, which claims the benefit of provisional application No. 61/174,515 filed May 1, 2009 and provisional application No. 61/293,035 filed Jan. 7, 2010;

(2) Application Ser. No. 13/116,487 filed May 26, 2011, now U.S. Pat. No. 8,615,443 issued Dec. 24, 2013, which is a continuation of Ser. No. 11/691,583 filed Mar. 27, 2007 and now U.S. Pat. No. 7,966,223 issued Jun. 21, 2011, which is a CIP of Ser. No. 11/279,642 filed Apr. 13, 2006 and now U.S. Pat. No. 7,881,968 issued Feb. 1, 2011, which claims the benefit of provisional application 60/671,928 filed Apr. 15, 2005;

(3) Application Ser. No. 13/299,679 filed Nov. 18, 2011, which claims the benefit of provisional application No. 61/415,026 filed Nov. 18, 2010, which is a CIP of Ser. No. 11/854,605 filed Sep. 13, 2007 and now U.S. Pat. No. 8,260,674 issued Sep. 4, 2012, which itself is a continuation-in-part of Ser. No. 11/691,583 filed Mar. 27, 2007 and now U.S. Pat. No. 7,966,223 issued Jun. 21, 2011, which itself is a continuation-in-part of application Ser. No. 11/279,642 filed Apr. 13, 2006 and now U.S. Pat. No. 7,881,968 issued Feb. 1, 2011, which claim the benefit of provisional application 60/671,928 filed Apr. 15, 2005; and (4) Application Ser. No. 13/594,299 filed Aug. 24, 2012, now U.S. Pat. No. 9,270,840 issued Feb. 23, 2016 and claiming the benefit of provisional application 61/526,823 filed Aug. 24, 2011.

This application incorporates by reference the entire contents of the utility and provisional applications identified above.

FIELD

This patent specification relates to automated systems and methods providing persons such as gusts at a facility or venue with customized souvenir portfolios containing professional quality images creating the illusion that the guests were imaged in other environments.

BACKGROUND

Techniques are known for taking professional quality images of people against painted backgrounds. For example, a person can be imaged in a studio while standing in front of a wall painted with a picture of Times Square, or against a blank wall and composited into a stock image of Times Square.

These processes have certain limitations. For example, taking images in a studio with the person in front of a wall painting is limiting because of factors such as the practical availability of only one or a few painted walls. Using a blank wall as background for images for merging with other images is not visually appealing and deprives the person being imaged of a sense of what the merged image will ultimately show, the person cannot pose in a way that accounts for the intended background, and there is no opportunity for interaction with background or for conveniently assessing different backgrounds. If the guest clothes contain a color close the blank wall color, there can be difficulties in extracting the person's image from the background or in changing the background color. In a television broadcast, a reporter can be seen as pointing to a weather map but in fact is in front of a blue or green screen and the reporter's image is digitally merged into a video clip of the weather map. Image merging also is used for special effects in movie making but through the use of highly specialized stages and image editing facilities that are impractical for use in settings such as with guests at a popular building or venue for portfolios that they could purchase.

SUMMARY OF THE DISCLOSURE

This patent specification describes systems and methods creating and distributing professional quality images giving the illusion that they were taken when a guest was in any of many environment that can be selected on the spot, preferably after viewing not only possible environments but also preview images of the guest appearing to be imaged in these environments. The system and methods are designed to encourage a guest to purchase images by making the process particularly convenient and allowing a guest to experience being in the virtual environments. For example, a guest can be standing in the Empire State building or in fact anywhere, and see on surrounding video surfaces such as walls, floor and ceiling a succession of different possible background scenes, such the building in different light or whether conditions, the street below, or a view to the Statue of Liberty at different times of day, or even scenes of Paris that would be seen from the Eiffel tower. The guest's image can be inserted into any of these backgrounds to give the illusion that the guest actually was imaged in that environment. The guest can look at possible background images to make a selection and also can look at preview merged images to make purchase decisions, in response to which the system and method can automatically create a customized portfolio, charge the guest, make any needed transactions with third parties, and deliver the portfolio to the guest and/or designees in electronic or hard copy form.

One example of a preferred embodiment is a computer-assisted method of creating and distributing professional quality pictorial souvenirs giving the illusion that the guest was imaged at other locations. The method comprises showing background scene image frames on a video surface for selection, taking guest images while a video surface flashes a chroma key background, preferably in a way that does not interfere with the guest's perception of being in the background scene shown on the video surface, image-processing the guest image taken against a chroma key background in a programmed computer to extract the guest image from the surrounding key background, merging the extracted image with one or more selected background scene images to generate preview images showing the guest merged into the selected scene images, showing merged preview images to the guest, and responding to interaction with the guest to identify images for purchase, generate pictorial souvenirs from the purchased images, charge guests for pictorial souvenirs, account for charges to or from third parties such as advertisers and content owners, and deliverer the souvenirs to guests and/or designees, including essentially instant delivery for immediacy of fulfillment. Flexibility can be built in by techniques such as improving guest flow by varying the choice of background scenes from fewer scenes offered on busy days to more on slower days. Up-sale options can be offered such as portfolios that include special frames or effects. The system also can include data mining so that system aspects such as guest flow and types of offerings can be improved based on experience gained with guests and so that promotional activities can be improved.

Plural key guest images of a guest can be taken in succession, possibly with respective different chroma key backgrounds, so that the best extraction of a guest image can be used in merging with background scenes, or portions of different extractions can be combined for best result. The guest may or may not be aware of key backgrounds that are flashed on the video surface because they can be displayed for only a very short time, e.g., for only a single video frame or even for two video fields interspersed among the fields and frames of background scene images. As a result, the guest's perception can be that the images are actually taken in the environment of the background scene images, e.g., at Time Square or on top of the Eiffel Tower. Plural cameras can be used concurrently and/or in succession, to give customers the option of viewing plural preview images and thus encourage the purchase of more portfolio content. The background scene images can be stock or live images, and can include zooming in/out. For example, a customer image can be inserted in an image of the Eiffel tower in the form of a video clip as though taken from a satellite or a helicopter filming Paris and zooming down to the tower and then to the customer standing on top of the tower. Between taking guest images, the video surface can show promotional material. A guest can engage with the system through a device such as a smartphone, a tablet computer such as an iPad or similar device mounted at a convenient location, of through a kiosk that may or may not use help from facility personnel to facilitate or encourage purchases of portfolios, The term guest is used in this patent application to refer to an individual or a group of individuals such as visitors to a tourist or other attraction. The term video surface designates one or more surfaces, such as walls, floors, and ceilings near or surrounding a guest, which surface can show background scenes, chroma keys, or promotional or other material. Examples are LCD or plasma screen displays, front-projection or back-projection video screens, and other types of displays of video images that exist or will come into use. Key image refers to a background such as a red, blue, or green, or any other color image that can be shown on the video screen and from which a guest image can be extracted by processing such as segmentation. Key guest image means an image of guest that is taken with a key image serving as background. Background scene image refers to any image that can be shown on the video screen, such as an image of Times Square or Paris.

Another example of a preferred embodiment is an automated system configured to create professional quality pictorial souvenirs giving the illusion that a guest was imaged at other locations. The system can comprise a guest facility that includes a video surface serving as background for taking key guest images and for showing background scenes and/or other images, an automated camera system configured to take key guest images at the facility, a video image source of background scene and key image frames, a system control computer configured to direct the image sources to supply selected background scene image frames and key image frames to the video surface and to direct the video surface to display the supplied background scene image frames and key image frames, where the system control computer is further configured to direct the camera system to take key guest images when the video surface is displaying at least one of the key frames, thereby producing key guest images with key image backgrounds, an image processing computer configured to receive a key guest image, extract an image of the guest, and merge the extracted image with respective selected scene images, thereby forming merged images of guests against selected background scene images, and a payment and delivery computer configured to respond to guest orders for merged images by automatically charging guests and delivering paid-for souvenir portfolios containing merged images to guests or designees, and accounting for any payment to or from third parties.

Other preferred embodiment and variations and features thereof will become apparent from the detailed description and appended figures. These and other features and aspects of the new system and method are illustrated in the drawings briefly described below and from the more detailed description of preferred embodiments that follow. The drawing is solely for the purpose of illustration and description; they are not to scale and do not show every feature or detail, and are not intended as a definition of the limits of the claimed inventions. Features, components, elements, and steps that are illustrated in one figure or are described in one example or embodiment of the new systems and methods can be used together with and in combination with features, components, elements, and steps that are illustrated in another figure(s) or are described in other example(s) or embodiment(s).

DETAILED DESCRIPTION OF PREFERRED EMBODIMENTS

Figure 1:
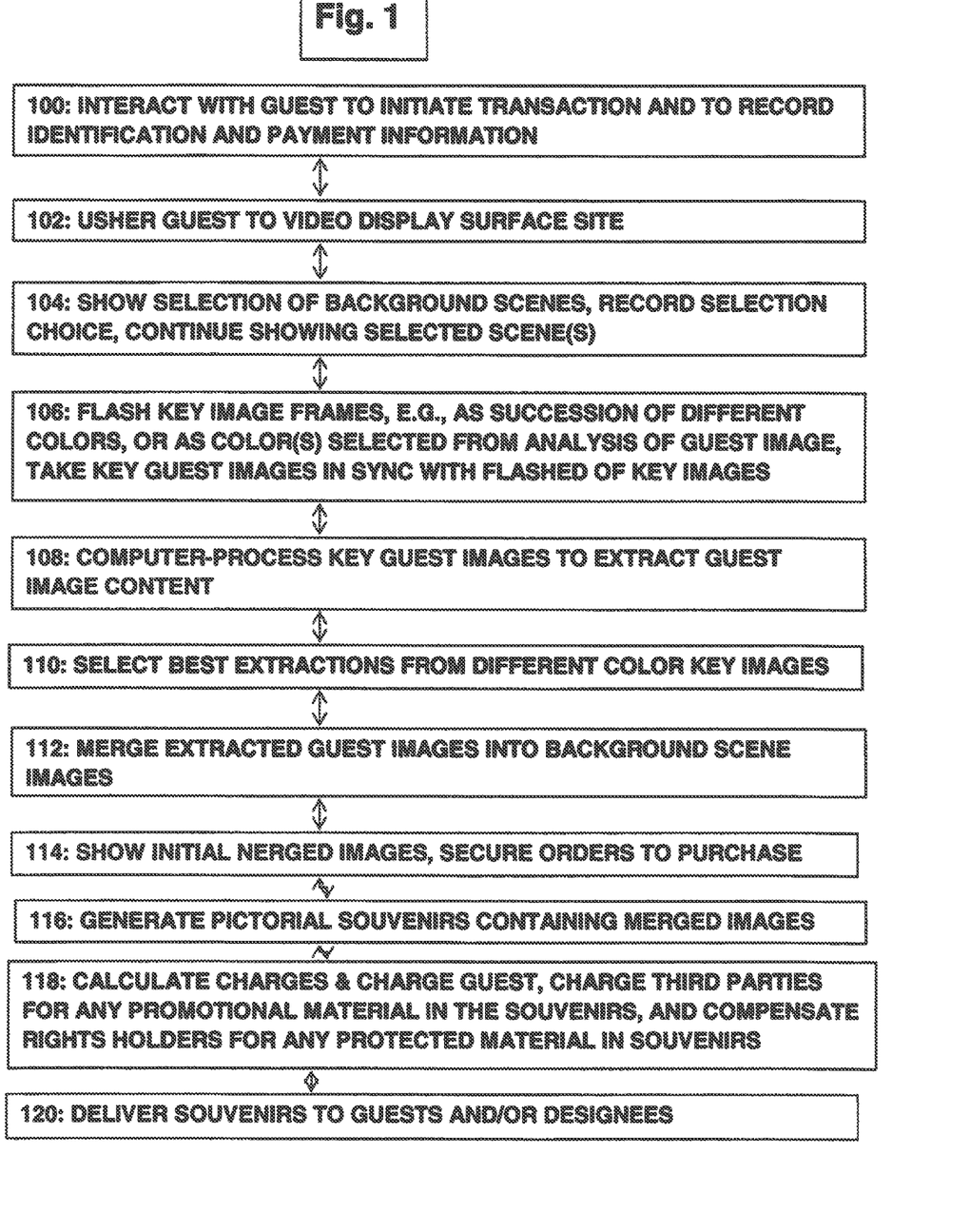
FIG. 1 is a flow chart illustrating main steps of a method that is an example of an embodiment described below.

FIG. 1 illustrates main steps in a preferred embodiment. As one of many possible examples, consider a facility in a tourist attraction such as the top of the Sears Tower in Chicago or the Empire State building in New York City. The guests are tourists or other visitors. Some may be receptive to creating and purchasing a professional quality pictorial souvenir of their visit. Of course, there are other examples such as visitors to any venue where it can be expected that some may be interested in a pictorial souvenir of their experience that could include images the visitors cannot take or at least cannot conveniently take themselves.

Some or all the steps illustrated in FIG. 1 can be included in a process that can involve significant participation by facility personnel, or in a process that primarily involves the use of automated equipment. In the case of the former, step 100 includes interaction between guests and facility personnel: for example, guests are welcomed by facility personnel upon arrival at the facility or a reception venue, and are directed to an imaging studio. Any guests who decline are politely thanked and told to enjoy their visit. In step 102, a guest who has not declined is ushered into an imaging location to be appropriately positioned with respect to a video display surface and camera and lighting systems, and to receive suggestions on posing. In step 104, the guest at the imaging location can be shown scenes on the video surface so that one or more can be chosen for merging with guest images. In step 106 one or more background key image frames such as chroma key frames are flashed on the video surface, and guest key images are taken in sync with the chroma key images. In step 108 a computer processes the guest key images to extract the images of the guest, and in step 110 selects the best extractions, possibly including from several otherwise identical guest key images taken with different chroma key backgrounds or by combining guest image content from images taken with different chroma key images. In step 112, an image processing computer merges the extracted guest images into one or more of the selected scene background images, and in step 114 at least some of the resulting merged images are displayed for the guest to make a selection and to order any for inclusion in a guest souvenir portfolio. Step 116 involves generating the ordered souvenir portfolios, in electronic form and/or as a hard copy, and step 118 involves calculating charges and charging guests and any third parties and providing compensation to any third parties, and step 120 includes actually delivering the portfolios and any upsell items to guests and/or their designees.

A variation can comprise greeting and directing guests as described above and having a photographer taking an image of a guest against a key image that may or may not be on video surface. Several guest key images can be taken in rapid succession, for example from different angles so that merged images can include the guest looking up or down or straight ahead, or so that different chroma key images can be used depending on items the guest is wearing or holding. After confirming the quality of the guest key image, the photographer can thank and give the guest a themed card with a code such as a 4-digit number or a barcode and explain where the guest can select and pick up merged images, and possibly select background scene images. Facilities personnel greet guests who might order portfolios, and scan or otherwise enter the code in a computer system that automatically merges a guest image extracted from the guest key images with one or more of popular background scene image appropriate for the venue, and the system displays the results to the guest. The guest is prompted to make a selection or to view guest images merged into different backgrounds, and to make purchase decisions for merged images and any delivery options of upsell items or services. Traffic flow and transaction speed can be enhanced by controlling factors such as the number of options for background scene images and/or merged images presented to a guest, the duration of display of merged or other images for selection, the number of purchase option offered to a guest, etc. The guest is given choices of ways to pay for ordered souvenirs, and after payment the guest receives the pictorial souvenir, for example as a copy that is printed and possibly bound on the spot and/or as an electronic version.

In an example of an implementation using greater degree of automation, step 100 involves interaction by electronic communications that can be wireless or wired. For example, a guest can be prompted by a sign or in some other way to communicate by a smartphone or another wireless or wired electronic device with a system website or a system computer, to thereby initiate a transaction and record guest identification and payment information such as a credit card number. A guest may have previously interacted with the same or related system, in which case the interaction can use pre-existing information. In step 102, the guest is directed by signs or messages to a personal device to pose at a video display surface, and in step 104 the system shows the guest one or more background scenes, on the video surface or on the guest's electronic device or on another display, determines by an electronic communication which background scene or scenes the guest has selected, and continues showing selected scenes or other material on the video surface. In step 106, the video surface can show a selected background scene to the guest but intersperse flashes of key image frames or fields, such as blue or green, and the camera system can take key guest images at times in synch with the key images, possibly with multiple fixed cameral from different angles and possibly while flashing a succession of different chroma key images and using different lighting choices. In step 108, a computer included in the system processes the guest key images to extract the guest image content. For example, if the key image is a narrow range of blue of set intensity, this process extracts pixels that are outside that range of blue at that intensity. In step 110, the system computer selects the best extraction based on factors such as smoothness of the extracted image and shading. For example, if guest key images were taken with each of red, blue, and green key images, the system computer may select the guest image extracted from the blue background because it has the best appearance, e.g., because the guest's clothing did not include any blue close to the background key image. This process can compare several guest images extracted from key guest images using different chroma keys and select the best guest image, or the best combination of guest images when merged into a single guest image, based on comparison results and factors such as smoothness of the guest images, color consistency, overall quality, etc. In step 112, the system computer merges guest images into background scene images that the guest has selected and/or that the computer system has selected for offering to the guest, and in step 114 offers some or all of the merged images as preview images to the guest. The scene images can be still or video images, and can be from stock or from live cameras viewing venues such as streets or events. Similarly, the guest key images can be stills of video clips generated by repeatedly flashing chroma key frames or fields in synch with taking key guest image frames or fields, A scene image can involve zooming in and/or out, for example zooming into the location at which the customer is imaged from a satellite or an aircraft. This showing of background scenes can be done on the same or a different video surface or display and/or on the guest's personal device such as a smartphone. If preview images are shown on a device that the system does not control, they can be modified in some way so that the guest would not be tempted to keep them in place of paid images. For example, the preview images can be coded to disappear from the guest device in a few seconds, or to change in appearance, or to have lower resolution, or to include content that makes them less desirable than paid images.

Still in step 114, the customer communicates orders to purchase a souvenir portfolio of some or all of the images seen in preview. In step 116, the system computer and other equipment generate a souvenir portfolio containing the ordered images and possibly other material such as images of the venue or other sites or of people or events, promotional material, advertisements, gift items, sound, etc. Sound can come from any of a number or sources; for example, from a guest's smartphone or microphones near the guest, or from stock sound tracks, of live from microphones at other locations. The portfolio thus can comprise still images, video images, or both, with or without sound. In step 118 the system computer calculates charges for the guest and possibly charges to or from third parties. For example, if a merged image includes a scene in which a third party has rights such as copyright, a payment may be due to the third party. If material in the portfolio includes promotional material from a third party, a payment may be due to the system from a third party. Also in step 118, the system computer can finalize the charges through an automated charging system. In step 120, the souvenir portfolio is delivered to the guest and/or designees of the guest. For example, the portfolio can be sent electronically to the guest's smartphone of tablet, to an address the guest has specified, to a printer system in the facility that can print and bind a hard copy, and/or an order can be sent to an off-site printing facility to print and package the portfolio and deliver it to the guest or a designee.

Figure 2:
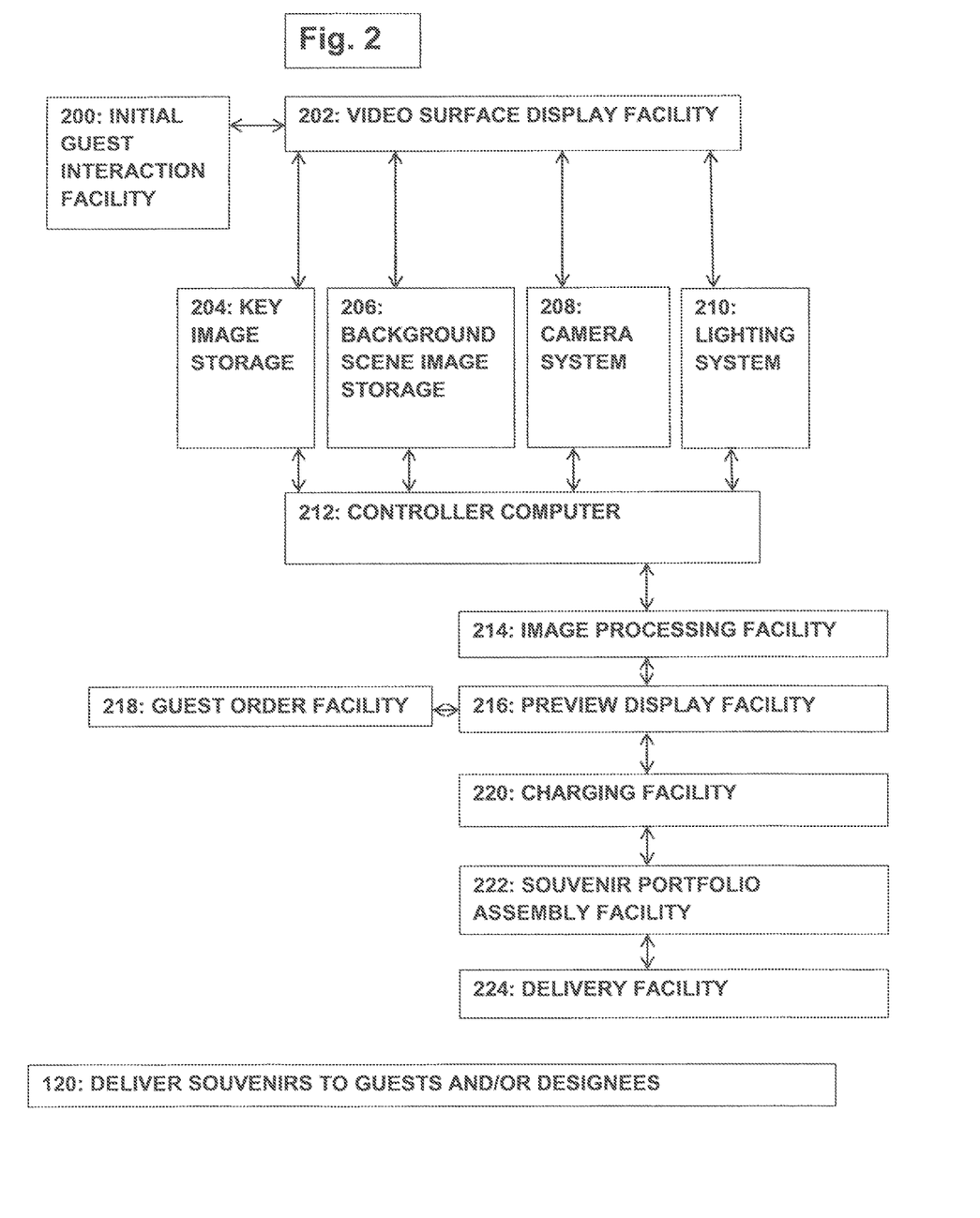
FIG. 2 is a block diagram of a system related to the method illustrated in FIG. 1.

FIG. 2 illustrates in block diagram form facilities that can be used to carry out processes described above. Guests can proceed through an initial guest interaction facility 200 where they can provide identification and charging information or where initial guest key images can be taken. Guests then proceed to a video surface display facility 202 where images of a guest can be taken against a chroma key image and where the guest can perceive being in different scenes by showing such scenes on the video surface. Video surface 202 can be a single wall of display screen such as a projection screen or screens such as LCDs that typically is higher and wider than a guest even when the guest is a group of people. In addition, video wall 202 can include similar screen or screens or one or more other walls, on a ceiling, and/or on the floor, so that the guest can be imaged against key images on multiple surfaces from multiple angles. Key image storage 204 provides a chroma key image to facility 200, which can be a single key or multiple keys having different color and intensity characteristics. Background scene image storage 206 provides one or more scenes for display on the video wall in facility 202 or on other displays. A camera system 208 takes images of the guest in facility 202, and a lighting system 210 provides appropriate lighting. Storage 204, storage 206, camera system 208, and lighting system 210 operate under the control of a computer controller 212 to flash chroma key images on video surface 202 as needed when camera system 208 is taking guest key images, to provide appropriate lighting from lighting system 210, and to show on video surface 202 at other times scenes from storage 206, which scenes can be backgrounds for merged images or promotional or other material. The guest key images and the background scene images that have been selected for merging are processed in image processing facility 214 into merged images, for example using technology similar to that used for merging images in Adobe Photoshop. The merged images are presented for guest review and selection at preview facility 216 that can use video surface 202 to display preview merged images, but preferably uses other displays such as a display on a guest smartphone and/or on a video display different from video surface 202. In response to orders for merged images from guest order facility 218, which can use a guest smartphone or some other fixed or portable electronic device, preview facility 216 supplies the ordered merged images to charging facility 220, which calculates and makes charges to the guest and to any sources of promotional material for items included in the guest's souvenir portfolio, and also any charges to be paid to third parties such as copyright owners for protected content includes in a guest portfolio. A souvenir portfolio assembly facility prepares the ordered souvenir for delivery. If only an electronic copy is to be delivered, facility 222 sends it to delivery facility 224 as an electronic document for sending to the guest's smartphone, to an address or a social network that the guest designates, and/or to some other destination that the guest specified. If a hard copy is involved, assembly facility 222 can be provided with printing and binding/packaging equipment to prepare it, and possibly to include add-ons such as gift items or special effects such as special frames, LED lights, sound sources, and controllers for such lights and sound sources. Assembly facility 224 can be at the same or close physical location as video surface 202, or it can be at a remote location, or parts can be at different locations. For example, a part involved with souvenir portfolios in electronic form can be at or close to video surface 202 and a part involved in hard copy souvenir portfolios can be at a different location.

In another example, an initial image can be taken of a guest and subjected to computer analysis for color content to select a chroma key image in a color that differs from guest body or attire colors.

In another example, pattern recognition can be used to generate a metric related to the number of people in the extracted guest image, and the charging of gusts for the pictorial souvenirs comprises adjusting charges in relation to the metric.

Figure 3:
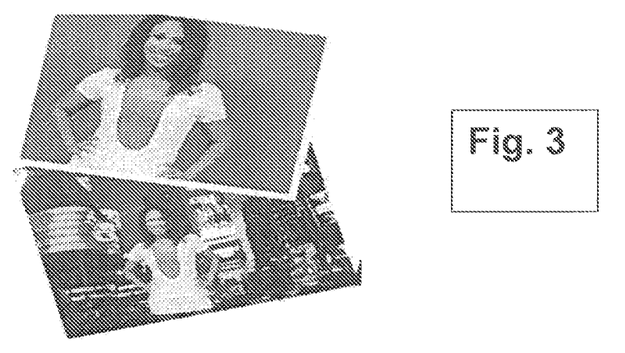
FIG. 3 illustrates a key guest image and a merged image into which an extracted guest image has been inserted.

FIG. 3 illustrates a simple example of a key guest image of a woman taken against a chroma key background that can be red, green, blue, or some other color that differs from her skin tone and dress colors, and a merged image in which the extracted image of the woman has been merged into a background scene of buildings.

Figure 4:
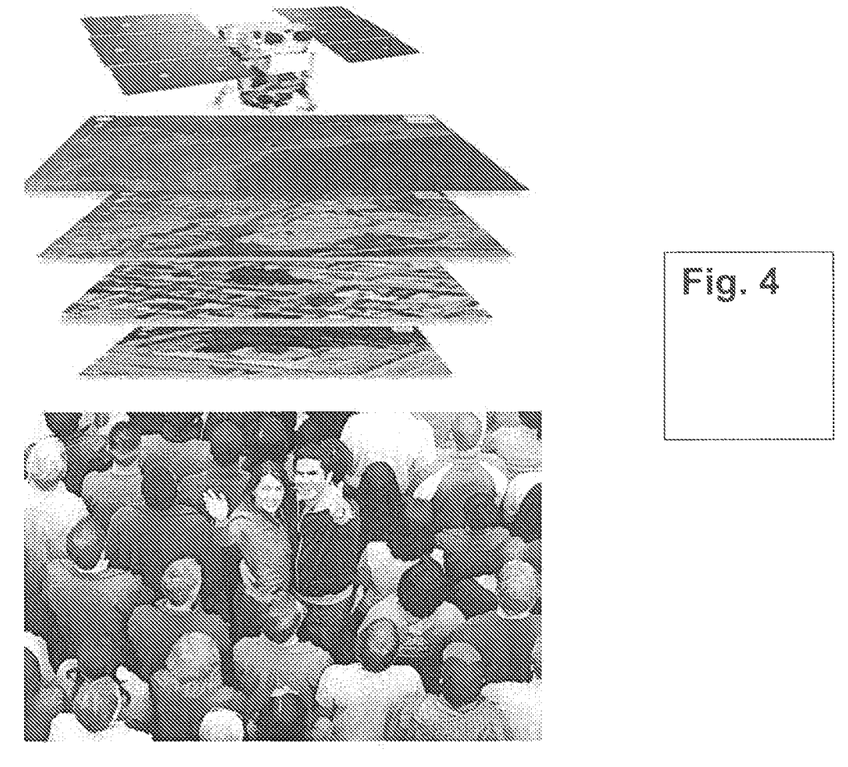
FIG. 4 illustrates several frames of a video clip showing zooming in from a satellite image to an image of a couple that has been extracted from a guest key image of the couple and merged into a frame showing a crowd into which the video clip is zooming.

FIG. 4 illustrates an example of creating a merged image involving zooming in to create an illusion that a satellite image is zooming in on an event at a venue with a crowd. The images above the waving couple can be from a service such as Google Earth or from a camera on an aircraft or similar images can come from a camera mounted on a high support. The image of the couple can be a still or video image extracted from a guest key image that is merged into a stock or live image of a crowd as described above, and also merged into the zooming sequence video clip.

Figure 5:
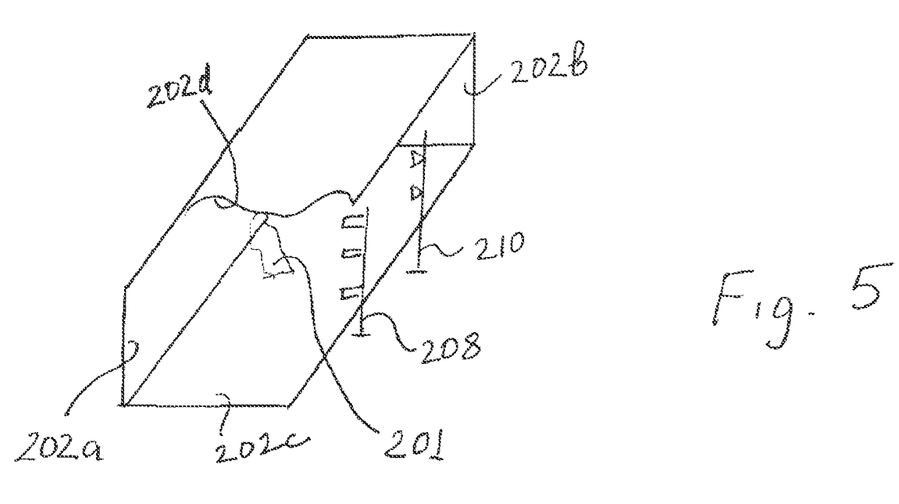
FIG. 5 schematically illustrates an environment in which guest images can be taken against a video display surface that can include walls, a floor, and a ceiling.

FIG. 5 schematically illustrates an environment in which images of guests 500 can be taken against a video surface display that can include side walls 202a and 202b, a floor 202c, and a ceiling 202d, with a camera system 208 with three cameras pointing to a guest 201 on floor 202c at different angles, and a lightning system 210. As described above any one or more of the illustrated portions of video surface display 202 can show background scene images, key images, or other material.

For conciseness, the system operation described above omits conventional steps that a skilled computer software designer or programmer would know how to implement, and gives an example of a sequence of steps that need not be performed in the illustrated order, and do not require the full set of illustrated steps to be performed in every use of the system or method. As a non-limiting example, step 104 can be omitted for some implementations, and step 116 can start before step 114. Hardware/software system designers and programmers can implement specific examples of the disclosed systems and method without undue experimentation according to the description in this patent specification and can select specific design goals and tradeoffs in cost, performance, and other factors.

In the foregoing description, certain terms have been used for brevity, clarity, and understanding, but no unnecessary limitations are to be implied therefrom beyond the requirements of the prior art, because such words are used for description purposes herein and are intended to be broadly construed.

At least some of the process steps described above can be formatted as algorithmic steps represented by a computer program that, when loaded into a suitable computer system, causes the system to carry out those steps. In such a case, computer-readable media in which such a program is stored in non-transitory form, can be considered to be a computer program product.

The embodiments of the systems illustrated and described herein are by way of example, and the scope of the invention is not limited to the exact details of construction and use. Components and features described in one embodiment can be used instead of or in addition to components and features described in the context of other embodiments.

The invention claimed is:

1. A method comprising:
   using one or more cameras to take guest images of one or more guests at a facility and providing background scene images;
   computer-processing the guest images with a computer system;
   computer-merging the guest images into the background scene images with a computer system to form merged images; and
   assembling customized souvenir portfolios that include at least some of the merged images,
   wherein said providing of the background scene images comprises flashing the background scene images on a video display surface imaged by said one or more cameras.

2. The method of claim 1 in which said taking of the guest images comprises taking plural guest images of a same one or more guests to form respective different chroma key guest images.

3. The method of claim 2 in which said computer-processing comprises comparing said plural guest images with each other or with the respective different chroma key images and selecting for merging a guest image that meets selected image criteria.

4. The method of claim 3 in which said image quality criteria include differences in color content between said plural guest images and said respective different chroma key images.

5. The method in claim 1 in which said taking of said guest images comprises concurrently taking each of at least some of said guest images with the one or more cameras having respective different perspectives.

6. The method of claim 1 in which said computer-merging comprises merging said guest images into the background scene images that comprise video clips.

7. The method of claim 6 in which said video clips include video that zooms in and/or out relative to the guest images.

8. The method of claim 1 comprising including at least a part of the background scene images in said video display surface at a floor supporting said one or more guests.

9. The method, of claim 1 comprising including said background scene images in said video display surface at two or more wails surrounding said one or more guests.

10. The method of claim 1 in which said flashing comprises showing at least some of said background scene images on one or more electronic screens comprising said video display surface.

11. The method of claim 1 including interacting with at least some of said one or more guests via smartphones to obtain guest information and supplying the obtained guest information to said computer system to associate with respective souvenir portfolios.

12. The method of claim 1, in which said assembling of said customized souvenir portfolios further comprises including in said customized souvenir portfolios other material selected from a group of promotional material, advertisements, and sound.

13. A method comprising:
   using one or more cameras to take guest images of one or more guests at a facility and providing background scene images;
   computer-processing the guest images with a computer system;
   computer-merging the guest images into the background scene images with a computer system to form merged images; and
   assembling customized souvenir portfolios that include at least some of the merged images,
   wherein said computer-processing comprises using pattern recognition to generate a metric related to a number of people in respective images of said guest images and charging for the customized souvenir portfolios by adjusting charges in relation to said metric.

14. An automated system comprising:
   a guest facility that comprises an automated camera system configured to take guest images;
   a source of background scene images;
   a system control computer configured to direct the camera system to take one or more guest images of said guests;
   a video display surface showing said background scene images and chroma key images at different times; and
   an image processing computer configured to receive and process said one or more guest images and to merge the one or more guest images with selected ones of the background scene images, thereby forming merged images of guests inserted into selected background scene images.

15. The automated system of claim 14 further including a payment and delivery computer system configured to respond to guest orders for said merged images and specify charges for delivering the ordered merged images to said guests.

16. The automated system of claim 14 in which said image processing computer is configured to merge said one or more guest images into one or more selected ones of said background scene images that comprise video clips.

17. The automated system of claim 14, in which said image processing computer is further configured to associate said merged images of guests with other material selected from a group of promotional material, advertisements, and sound.

18. The automated system of claim 14, in which said merged images of guests comprise multi-frame video clips.

\* \* \* \* \*